US010938286B1

(12) United States Patent
Liu et al.

(10) Patent No.: US 10,938,286 B1
(45) Date of Patent: Mar. 2, 2021

(54) LINEAR RESONANT ACTUATOR, CONTROL SYSTEM AND BRAKE CONTROL METHOD

(71) Applicant: TOPRAY MEMS INC., Hsinchu (TW)

(72) Inventors: Chin-Sung Liu, Hsinchu (TW);
Shin-Ter Tsai, Hsinchu (TW);
Hsiao-Ming Chien, Hsinchu (TW);
Tzu-Kuang Fang, Hsinchu (TW)

(73) Assignee: TOPRAY MEMS INC., Hsinchu (TW)

( * ) Notice: Subject to any disclaimer, the term of this patent is extended or adjusted under 35 U.S.C. 154(b) by 50 days.

(21) Appl. No.: 16/594,304

(22) Filed: Oct. 7, 2019

(51) Int. Cl.
| | |
|---|---|
| H02K 33/00 | (2006.01) |
| H02P 1/00 | (2006.01) |
| H02P 3/00 | (2006.01) |
| H02P 5/00 | (2016.01) |
| H02K 33/08 | (2006.01) |
| H02P 25/032 | (2016.01) |

(52) U.S. Cl.
CPC ............ *H02K 33/08* (2013.01); *H02P 25/032* (2016.02)

(58) Field of Classification Search
CPC .............................. H02K 33/08; H02P 25/032
USPC ............................................................ 318/114
See application file for complete search history.

(56) References Cited

U.S. PATENT DOCUMENTS

| | | | | |
|---|---|---|---|---|
| 2004/0228216 | A1* | 11/2004 | Butler | H04R 1/44 367/141 |
| 2008/0001484 | A1* | 1/2008 | Fuller | H02K 33/16 310/15 |

* cited by examiner

*Primary Examiner* — Erick D Glass
(74) *Attorney, Agent, or Firm* — Lin & Associates Intellectual Property, Inc.

(57) ABSTRACT

The invention discloses a control system for LRA, applicable to an LRA having a speed sensing coil. The control system comprises a signal amplifier, an excitation device, a flow controller, a processing unit, and a driver. The processing unit is connected to the signal amplifier, the excitation device and the flow controller, so as to stop output, output the excitation signal as a driving signal or process the induction signal from the signal amplifier into an appropriate system damping coefficient and output as a driving signal when the flow controller outputs a stop, excitation or braking state signal, respectively.

17 Claims, 10 Drawing Sheets

LINEAR RESONANT ACTUATOR, CONTROL SYSTEM AND BRAKE CONTROL METHOD

BACKGROUND OF THE INVENTION

Technical Field

The present invention relates generally to a linear resonant actuator, control system and brake control method.

Background

With the generalization of mobile devices, linear resonant actuators (LRAs) have also received increasing attention. The mobile device can provide vibration using a linear resonant actuator as a tactile feedback when the user operates the device.

FIG. 1A is a schematic view of the structure of a conventional linear resonant actuator, wherein the linear resonant actuator comprises at least a vibrator 101 containing a magnet, one or more driving coils 102 fixed to a fixed end 105, and a displacement restoring force device 104 connected between the fixed end 105 and the vibrator 101. The linear resonant actuator usually drives a movable magnet with a fixed driving coil, the magnet is connected to a fixed end by a spring, and the spring provides the restoring force of the magnet displacement. Generally, the linear resonant actuator has only an uncontrolled small damping in order to obtain higher drive efficiency. However, a low-damping linear resonant actuator usually has residual vibration that gradually decreases by a dozen to several tens of cycles after a sudden stop of the excitation driving. FIG. 1B is a schematic view showing the motion state of a conventional linear resonant actuator after being driven to vibrate. Wherein, the square wave 110 is the excitation signal for exciting the vibration of the linear resonant actuator; the signal 120 represents the vibration speed of the vibrator; and the signal 130 is the vibration speed of the vibrator after the excitation signal is terminated, indicating that the vibrator has residual vibration after the excitation driving is terminated. After the end of the desired excitation driving, residual vibration can be suppressed by another suitable reverse-driving, i.e., braking, causing the vibrator to stop more quickly, for example, in one to several cycles. The quick stop is more in line with the haptic effect of the simulated object, such as a traditional mechanical button, which also facilitates multiple effects with multiple transient vibration combinations.

It should be noted that since the linear velocity is directional (with positive/negative), since the vibration system is symmetric, in the following discussion, the directional linear velocity is replaced by the non-directional speed to simplify the complexity. In this context, the speed and linear velocity in the disclosure is exchangeable.

The conventional method is to obtain the back electromotive force (BEMF) of the driving coil as the feedback signal on the vibration control; FIG. 2 shows a schematic view of the feedback of the back electromotive force of the driving coil as the vibration control. Signal control diagram. As shown in FIG. 2, the output of the driver 201 is cut off intermittently by the controller 203 to measure the BEMF of the driving coil in the linear resonant actuator 210 by the measuring circuit 202, and then fed back to the controller 203 to regulate the output to drive the linear resonant actuator 210; however, cutting off the driving means losing the time utilization of the driving; alternatively, the actual output current of the driver 201 and the voltage of driving coil of the linear resonant actuator 210 under driving are measured, and calculating the BEMF of the linear resonant actuator 210 through the measurement circuit 202, and then fed back to the controller 203 to change the output to drive the linear resonant actuator 210. However, in this approach, it is necessary to consider and overcome the computational error caused by uncertain factors such as temperature and component aging. In addition, a Hall element or an accelerometer is often disposed in the linear resonant actuator 210 for position/acceleration detection for control; however, such systems are complicated and require consideration of the stability of the control system.

SUMMARY

An embodiment of the present invention discloses a linear resonant actuator, comprising: a vibrator, one or more driving coils, a displacement restoring force device, a fixed end, and an induction coil; wherein the vibrator being vibrator comprising a magnet set; the displacement restoring device having one end connected to the fixed end and the other end connected to the vibrator; the one or more driving coils being located at the periphery of the vibrator; the induction coil being fixed with respect to the vibrator.

In a preferred embodiment, the displacement restoring force device further comprises at least one elastic element, such as, a spring.

In a preferred embodiment, the induction coil and the driving coil may be located at different positions, or the induction coil and the driving coil may partially overlap.

In a preferred embodiment, the induction coil can obtain an induced voltage proportional to the speed of the vibrator by arranging an appropriate position and winding manner.

In a preferred embodiment, according to the induced voltage proportional to the vibration speed of the vibrator generated by the induction coil, a damping effect can be generated by feedback to achieve brake controlling method of the linear resonant actuator.

An embodiment of the present invention discloses a control system for a linear resonant actuator, which is suitable for a linear resonant actuator having an induction coil for sensing vibration speed of the linear resonant actuator, the control system comprising: a signal amplifier, for amplifying an induced voltage of the induction coil of the linear resonant actuator into an induction signal; an excitation device, for generating an excitation signal able to cause the linear resonant actuator to vibrate; a flow controller, for receiving a command, generating a control flow, and outputting a state signal corresponding to the control flow; a processing unit, connected to the signal amplifier, the excitation device, and the flow controller, according to the state signal outputted by the flow controller, for stopping outputting in a stop state, outputting the excitation signal in an excitation state, and processing the induction signal into a braking signal of a suitable system damping coefficient and outputting as a driving signal; a driver, connected to the processing unit and the linear resonant actuator, for driving the linear resonant actuator according to the driving signal outputted by the processing unit.

In a preferred embodiment, the control system does not drive the linear resonant actuator in the stop state, and the control system obtains DC offset of induction signal for compensation.

In a preferred embodiment, in the excitation state, the excitation device achieves vibration by outputting a predetermined waveform, or adjusting frequency, time interval, polarity, and amplitude of other adjustable output waveform.

In a preferred embodiment, in the braking state, the control system amplifies the induced voltage generated by the induction coil into an induction signal, then processes and feedbacks to the driver to drive the linear resonant actuator to attenuate vibration of the vibrator; and the termination of the braking state may be terminated by a state signal.

In a preferred embodiment, the magnitude of the induction signal is checked during the braking state to stop the output and to terminate the braking state.

Another embodiment of the present invention discloses a flow chart of a brake control method for a linear resonant actuator, comprising the following steps: step 901: providing an induction coil, the induction coil being disposed outside a vibrator of the linear resonant actuator, and the induction coil being fixed with respect to the vibrator, wherein the arrangement of the position and winding manner of the induction coil able to obtain an induced voltage proportional to vibration speed of the vibrator; step 902: according to the induced voltage, generating a damping effect by a feedback approach to achieve braking linear resonant actuator; wherein the damping effect must satisfy the following conditions: according to the motion equation $m*a=-b*v-k*x+f$; wherein m is the mass of the vibrator, b is the actuator damping coefficient, k is the spring constant, a is the acceleration, v is the speed, and x is the displacement, f is the driving force; and $k*x$ is the displacement restoring force, $b*v$ is the damping force; let $f=-b'*v$ denote the equivalent damping force to be generated by the driving coil, wherein b' is the damping coefficient for braking; therefore, the above motion equation becomes: $m*a=-(b'+b)*v-k*x$; wherein $-(b'+b)*v$ is damping force under the effect of the brake control method of the present invention, i.e., the target damping effect to be generated.

In a preferred embodiment, b' is the damping coefficient of the braking effect, comprising induction coil sensitivity (voltage/speed) and the driving efficiency of the linear resonant actuator multiplied by control system gain (force/voltage).

In a preferred embodiment, the induction coil and the driving coil of the linear resonant actuator may be located at different positions, or the induction coil and the driving coil of the linear resonant actuator may partially overlap.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The embodiments of the present invention are described by way of specific examples, and those skilled in the art can readily appreciate other advantages and functions of the present invention. The invention may be embodied or applied in various other specific embodiments, and various modifications and changes may be made without departing from the spirit and scope of the invention.

It is to be understood that the structure, the proportions, the size and the like of the drawings are only used to clarify the content disclosed in the specification for understanding and reading by those skilled in the art, and are not intended to limit the present invention, and therefore, not technically meaningful. Any modification of the structure, change of the proportional relationship or adjustment of the size shall fall within the scope of the technical content disclosed in the present invention without affecting the effects and the achievable objectives of the present invention.

Figure 1A:
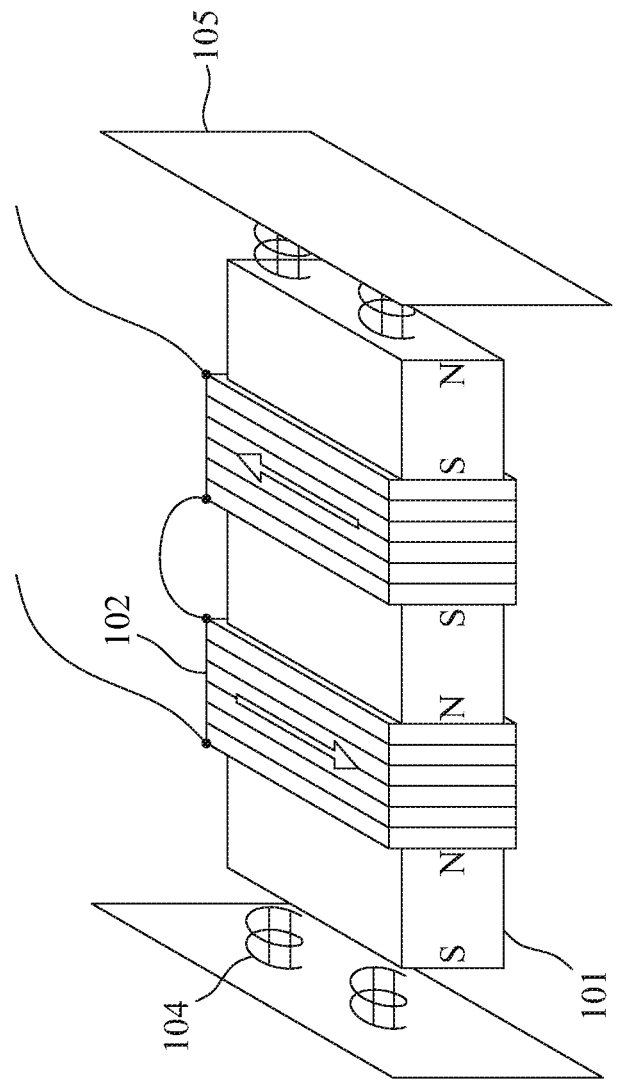
FIG. 1A is a schematic view showing the structure of a conventional linear resonant actuator.
Figure 3:
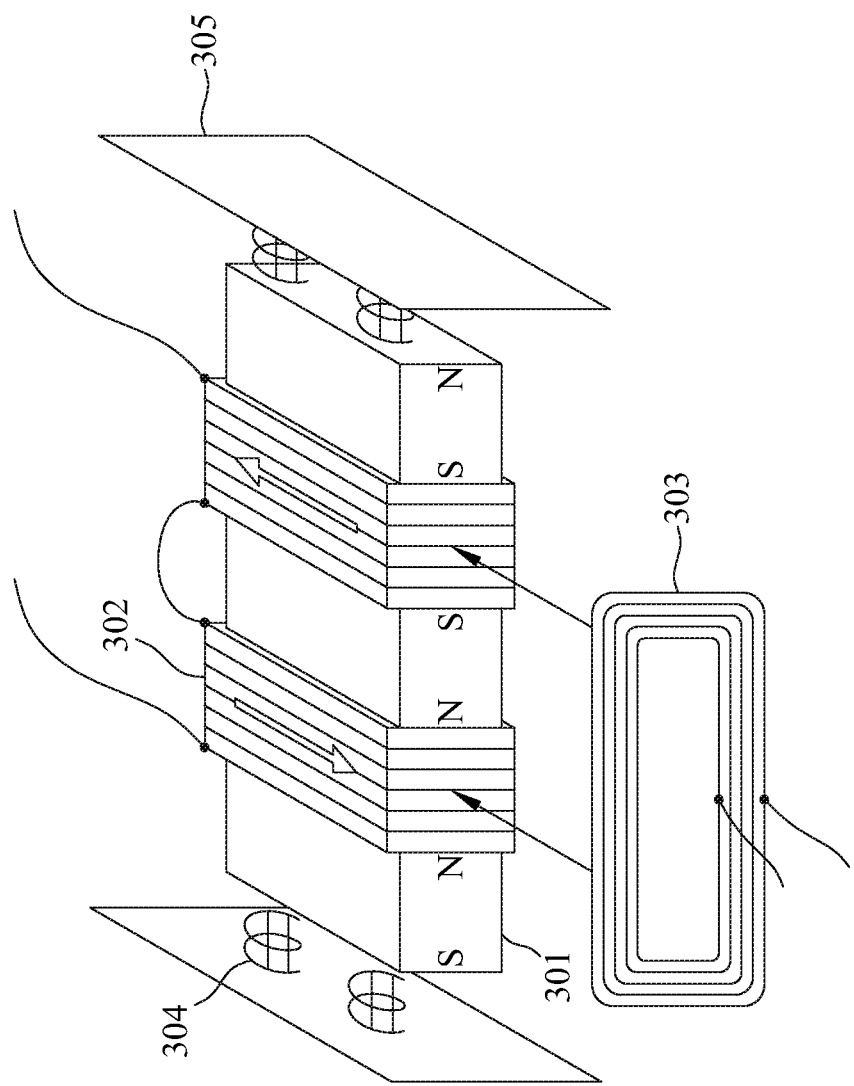
FIG. 3 is a schematic view showing a linear resonant actuator according to the present invention.

Referring to FIG. 3, FIG. 3 is a linear resonant actuator of the present invention. As shown in FIG. 3, the linear resonant actuator comprises: a vibrator 301, one or more driving coils 302, a displacement restoring force device 304, a fixed end 305, and an induction coil 303; wherein the vibrator 301, the driving coil 302, the displacement restoring force device 304, and the fixed end 305 are the same as the conventional linear resonant actuator of FIG. 1A, and the displacement restoring force device 304 further comprises at least one elastic element, such as a spring. The vibrator 301 is a vibrator comprising a magnet set; in other words, one end of the displacement restoring force device 304 is connected to the fixed end 305, and the other end is connected to the vibrator 301; the one or more driving coils 302 are located at the periphery of the vibrator 301. The induction coil 303 is disposed outside the vibrator 301 and is fixed with respect to the vibrator 301. That is, the induction coil 303 is disposed outside the conventional linear resonant actuator, and the induction coil 303 is fixed with respect to the vibrator 301; wherein the induction coil 303 and the driving coil 302 can be located at different positions, or the induction coil 303 and the driving coil 302 may partially overlap.

Since the vibrator 301 includes a magnet set, a specific spatial magnetic field vector distribution B is generated, and the movement of the vibrator 301 causes a magnetic field vector moving speed V; under this condition, the force f of a fixed electric charge q can be expressed as follows:

$$f = -qV \times B$$

Which is the Lorentz force, that is, the induced electric field $E = -V \times B$.

Therefore, a fixed wire segment dl can obtain an induced electromotive force de expressed as:

$$de = -dl \cdot E = -dl \cdot (V \times B)$$

Therefore, through the proper position and the winding manner of the disposition of the induction coil 303, an induced voltage proportional to the moving speed of the vibrator 301 can be obtained.

In other words, according to the induced voltage generated by the induction coil 303 proportional to the moving speed of the vibrator 301, a damping effect by a feedback approach can be achieved for controlling braking linear resonant actuator.

According to the motion equation $m*a=-b*v-k*x+f$; wherein m is the mass of the vibrator, b is the actuator damping coefficient, k is the spring constant, a is the acceleration, v is the speed, and x is the displacement, f is the driving force; and $k*x$ is the displacement restoring force, $b*v$ is the damping force; wherein the damping force $b*v$ of the linear resonant actuator is usually much smaller than the critical damping force, and f=0 when there is no driving.

Let $f=-b'*v$ denote the equivalent damping force to be generated by the driving coil in the brake control method of the present invention, wherein b' is the damping coefficient for braking, comprising the sensitivity of the induction coil (voltage/speed), i.e., the aforementioned induced voltage proportional to the vibration speed, and actuator drive efficiency (force/voltage) multiplied by the control system gain.

Therefore, the above motion equation becomes: $m*a=-(b'+b)*v-k*x$; wherein $-(b'+b)*v$ is damping force under the effect of the brake control method of the present invention. Hence, according to the control system gain of the linear resonant actuator, making the $(b'+b)*v$ achieve the target damping effect can shorten the time for the vibration to stop vibration.

Figure 4:
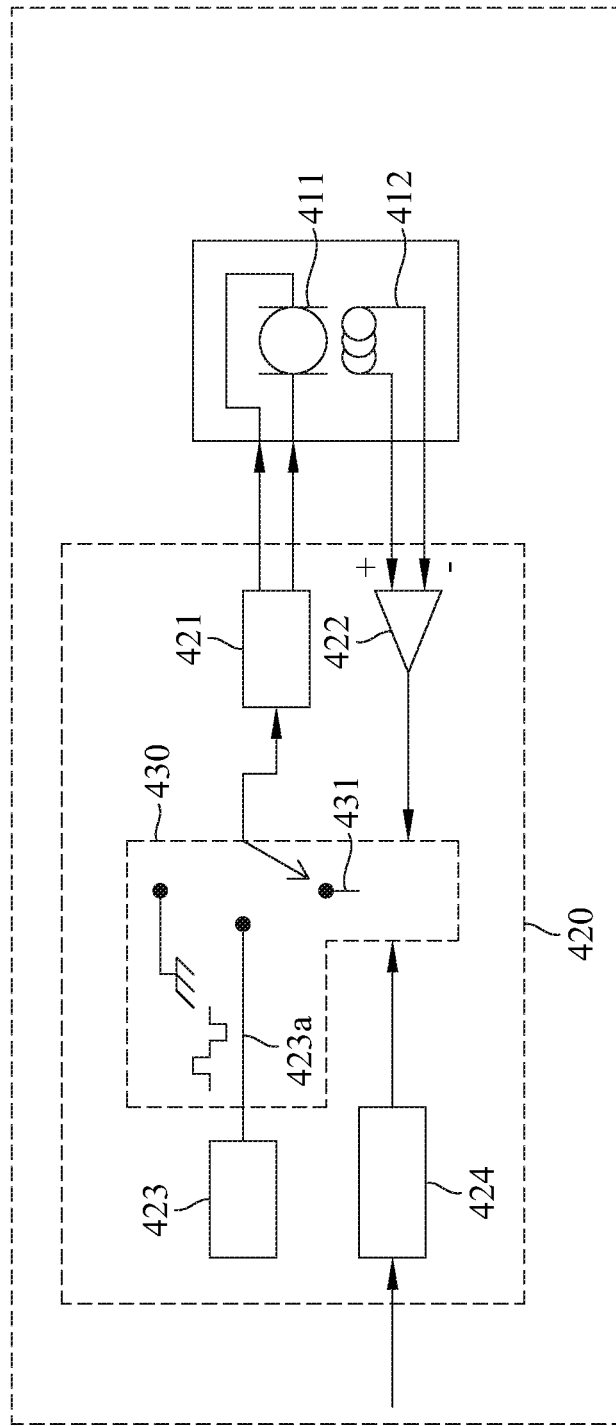
FIG. 4 is a schematic view showing a control system of a linear resonant actuator of the present invention.

FIG. 4 is a control system of a linear resonant actuator according to the present invention, applicable to a linear resonant actuator 411 having an induction coil 412 for sensing vibration speed of the linear resonant actuator 411, the control system 420 comprising: a driver 421, a signal amplifier 422, and an excitation device 423, a flow controller 424, and a processing unit 430.

Wherein, the driver 421 is connected to the processing unit 430 and the linear resonant actuator 411 to drive the linear resonant actuator 411 according to a driving signal outputted by the processing unit 430. The signal amplifier 422 is connected to the induction coil 412 of the linear resonant actuator 411, and the induced voltage of the induction coil 412 of the linear resonant actuator 411 is amplified into an induction signal, and the induction signal is fed back to the processing unit 430. The excitation device 423 is configured to generate an excitation signal 423a that causes the linear resonant actuator 411 to vibrate, and transmit the excitation signal 423a to the processing unit 430. The flow controller 424 is configured to receive an external incoming command, generate a control flow, and output a state signal corresponding to the control flow to the processing unit 430. The processing unit 430 is connected to the signal amplifier 422, the excitation device 423, and the flow controller 424 to output the driving signal to the driver 421 according to the state signal outputted by the flow controller 424.

It should be noted that the control system operates in at least three states: a stop state, an excitation state, and a braking state. That is, the state signal outputted by the flow controller 424 can be a stop state, an excitation state, or a braking state. In the stop state, the processing unit 430 stops outputting. In the excitation state, the processing unit 430 outputs the excitation signal 423a as the driving signal to the driver 421; in the braking state, the processing unit 430 processes the induction signal from the signal amplifier 422 into a braking signal of the appropriate system damping coefficients, and outputs as the driving signal to the driver 421. In a preferred embodiment, the processing unit 430 checks the magnitude of the induction signal in the braking state to stop the output and terminate the braking state.

Specifically, in the stop state, the control system does not drive the linear resonant actuator 411. In a preferred embodiment, the control system can use this time to obtain the DC offset of the induction signal in the stop state, and use as the reference level when processing the induction signal in the braking state.

In the excitation state, the control system can generate an excitation signal through the excitation device 423, and drive the linear resonant actuator 411 via the driver 421 to achieve its target vibration behavior. The excitation device 423 can achieve the excitation by outputting a predetermined waveform or adjusting the frequency, time interval, polarity, and amplitude of other adjustable output waveform.

In the braking state, the control system can amplify the induced voltage generated by the induction coil 412 into an induction signal, and then feedbacks to the driver 421 to drive the linear resonant actuator 411 to attenuate the vibration of the vibrator; the termination of the braking state may be triggered by a state signal or according to the magnitude of the induction signal.

Figure 5:
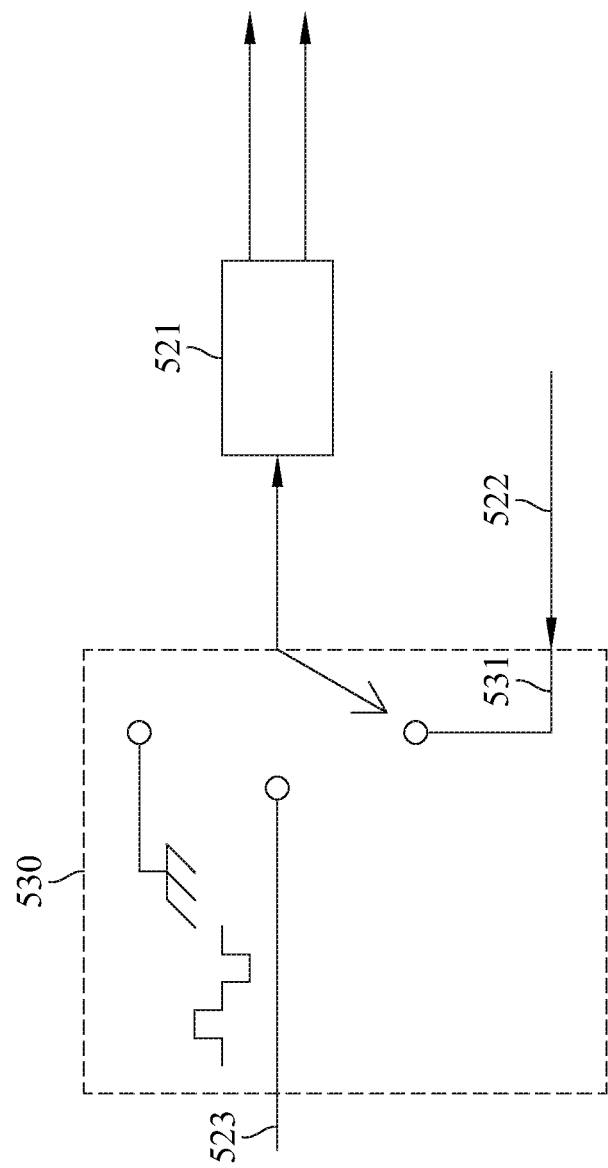
FIG. 5 is a schematic view showing a first embodiment of the processing unit of the control system of a linear resonant actuator of the present invention.

It should be noted that the processing unit 430 in FIG. 4 can be implemented in different ways depending on application requirements. The processing unit 430 is described below according to preferred embodiments:

FIG. 5 is a schematic view showing a first embodiment of the processing unit of the control system of the linear resonant actuator of the present invention. As shown in FIG. 5, in the case where the system gain is such that the damping coefficient is appropriate, the processing unit 530 can directly use the induction signal 522 as the braking signal 531, that is, the driving signal in the braking state. In this embodiment, the excitation signal 523 can be an analog signal, and the driver 521 can be an analog driver, for example, a bridge-tied load (BTL).

Figure 6:
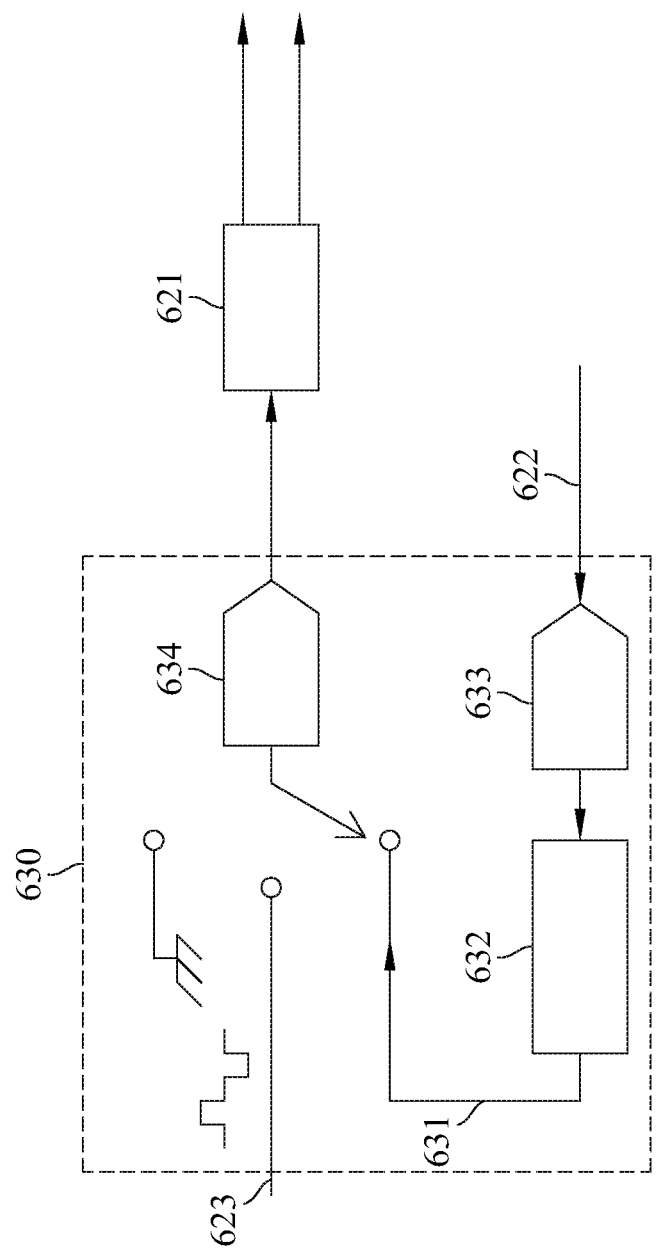
FIG. 6 is a schematic view showing a second embodiment of the processing unit of the control system of a linear resonant actuator of the present invention.

FIG. 6 is a schematic view showing a second embodiment of the processing unit of the control system of the linear resonant actuator of the present invention. As shown in FIG. 6, the processing unit 630 comprises an analog-to-digital converter (ADC) 633, a signal processor 632, and a digital-to-analog converter (DAC) 634. In the braking state, the processing unit 630 converts the analog induction signal 622 into a digital signal by the ADC 633, and the signal processor 632 performs a multiplication operation in a digital manner as the braking signal 631. The output signal obtained in each state is further provided to the analog driver 621, for example, the BTL, by the DAC 634 as the analog driving signal. In this embodiment, the excitation signal 623 is a digital signal. In the braking state, each time the ADC 633 converts and outputs signal, the ADC 633 can pause for a preset short time and then perform the next conversion.

In the first and second embodiments described above, the main implementation approach is to set the control system gain according to the driving efficiency of the linear resonant actuator and the sensitivity of the induction coil, so that $(b+b')*v$ can reach the desired damping effect to shorten the stop time of the vibrator; where b' is the system damping coefficient of the braking action, comprising the induction coil sensitivity (voltage/speed) and the actuator driving efficiency multiplied by the control system gain (force/voltage).

Figure 7:
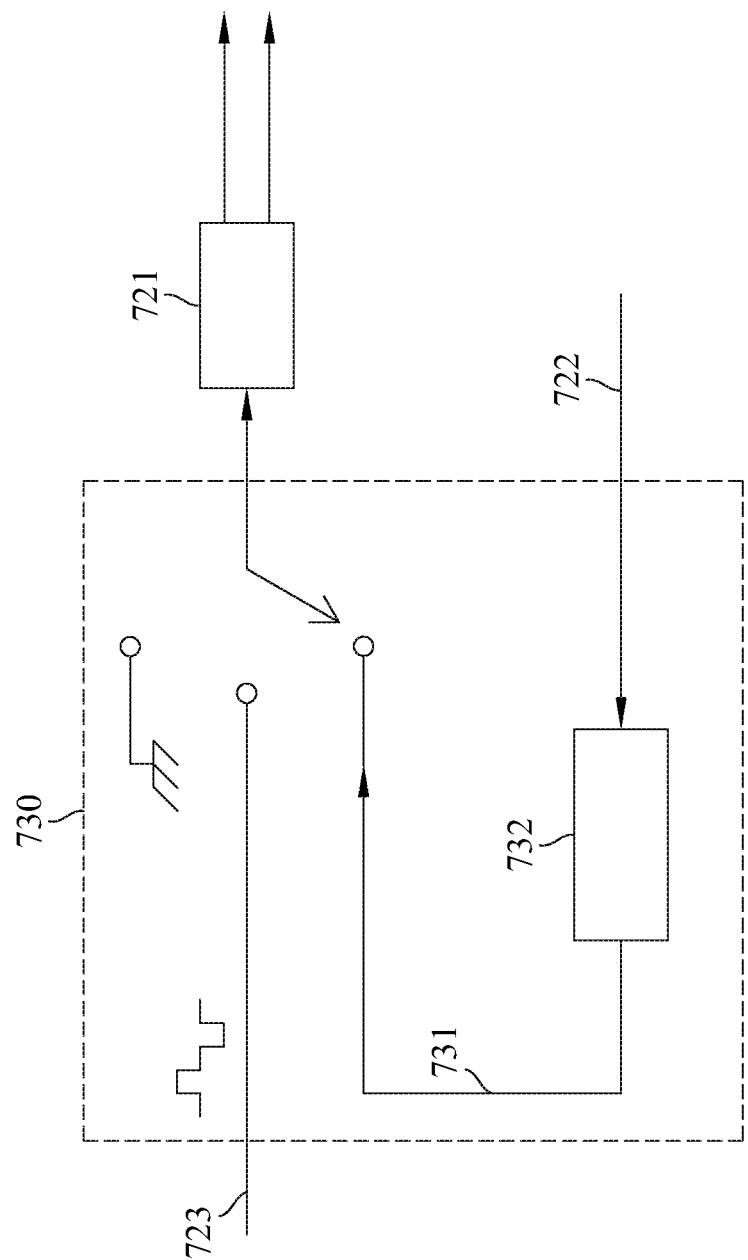
FIG. 7 is a schematic view showing a third embodiment of the processing unit of the control system of a linear resonant actuator of the present invention.

FIG. 7 is a schematic view showing a third embodiment of the processing unit of the control system of the linear resonant actuator of the present invention. As shown in FIG. 7, the processing unit 730 comprises a signal processor 732. The driving signal provided to the driver 721 is one or a combination of the representatives of forward driving (positive), reverse driving (negative), and non-driving (zero), and hereinafter referred to as a polarity signal.

The signal processor 732 provides the function of converting the real-time induction signals 722, calculating, and outputting the braking signal 731 in a form of one of the polarity signals. The signal processor 732 internally sets two threshold voltages V+ and V−, V+ is higher than the induction signal in the stop state, and V− is lower than the induction signal in the stop state; when the voltage of the real-time induction signal 722 is higher than V+, the output of the signal processor 732 is positive; when the voltage of the real-time induction signal 722 is lower than V−, the output of the signal processor 732 is negative; and when the voltage of the real-time induction signal 722 is between V+ and V−, the output of the signal processor 732 is zero.

In the braking state, the processing unit 730 uses the polarity signal outputted by the signal processor 732 as the braking signal 731. The excitation signal 723 in the present embodiment is also in the form of a polarity signal, and the driver 721 can be a digital driver, for example, an H-bridge. After the polarity signal of the signal processor 732 outputted in the braking state is changed, the output can be maintained for a preset period of time and then updated.

In the above third embodiment, the main implementation approach is to set the appropriate values of the two threshold voltages V+ and V−, that is, determine the gain of the system, and the interval between the two threshold voltages is also the acceptable range of the residual vibration signal.

Figure 1B:
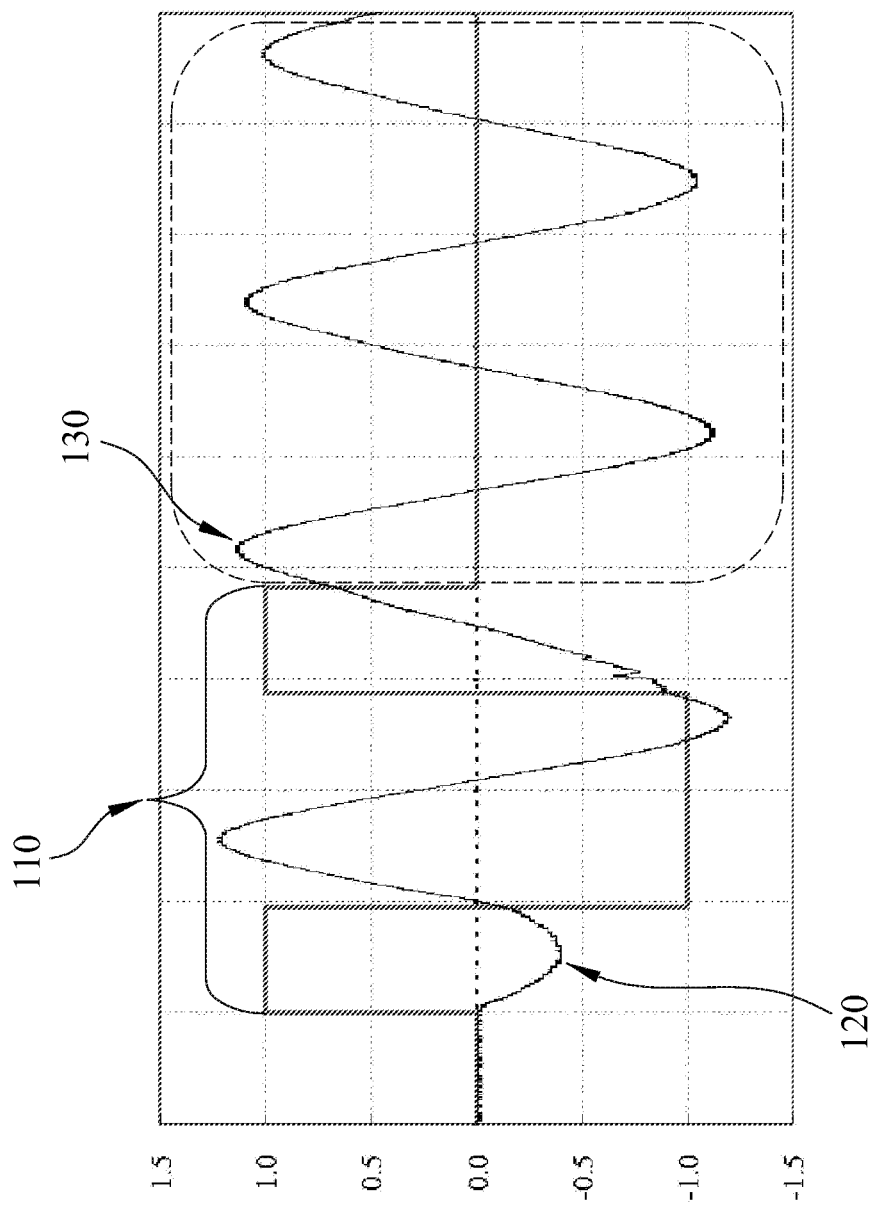
FIG. 1B is a schematic view showing a motion state after a conventional linear resonant actuator being driven to vibrate.
Figure 2:
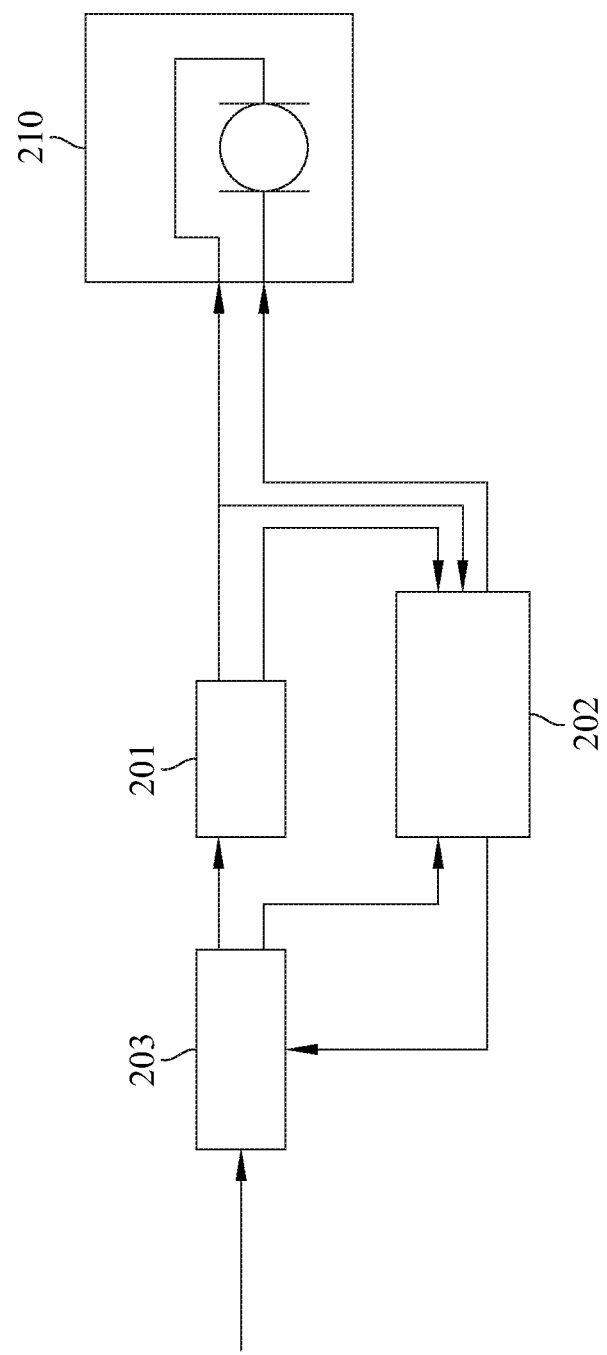
FIG. 2 is a schematic view showing a conventional approach of using BEMF of driving coil as feedback in brake control.
Figure 8:
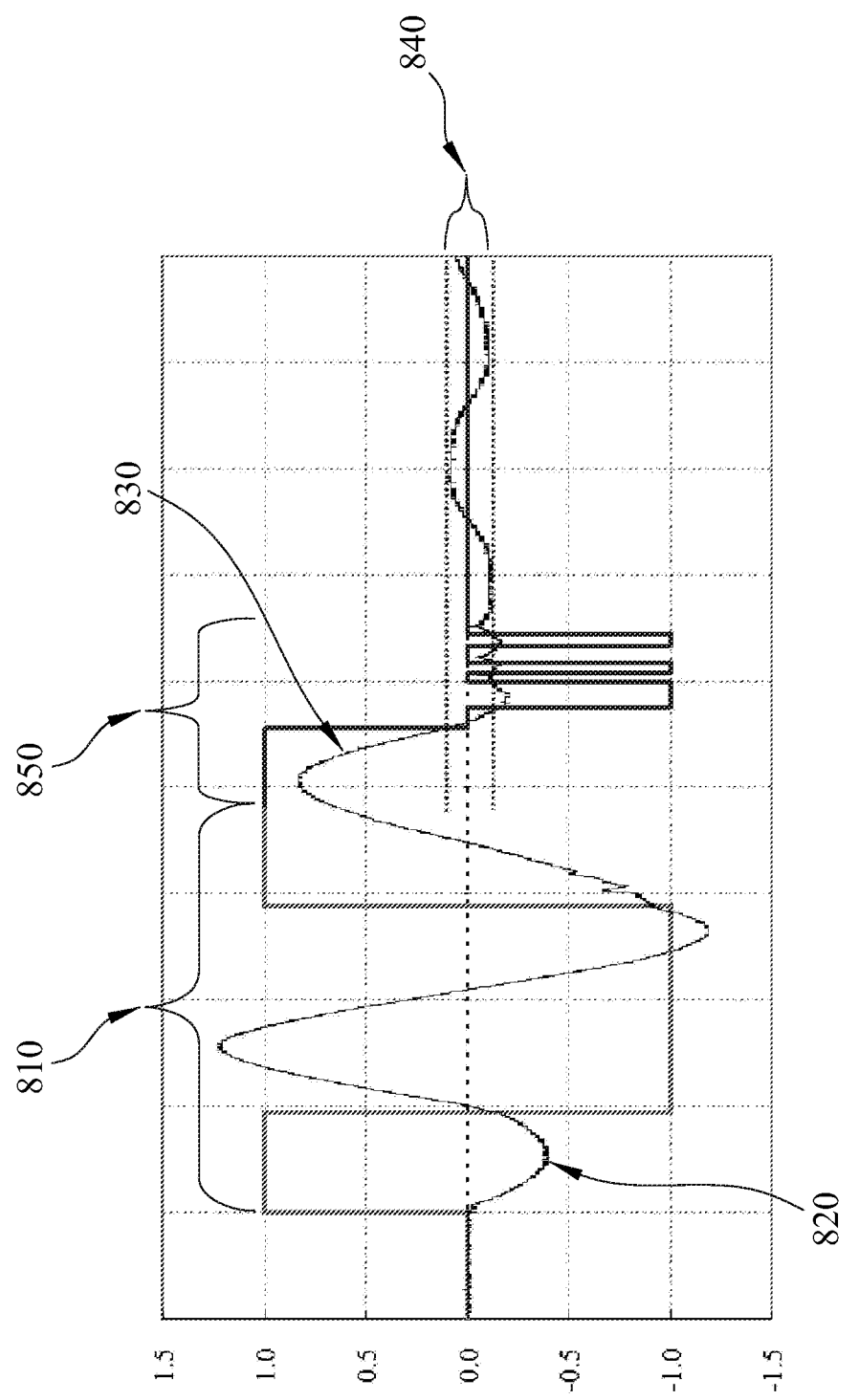
FIG. 8 a schematic view showing a motion state after the linear resonant actuator of the present invention being driven to vibrate.

FIG. 8 is a schematic view showing the motion state of the linear resonant actuator of the present invention after being driven to vibration; wherein, the square wave 810 is an excitation signal for exciting the vibration of the linear resonant actuator; the signal 820 represents the vibration speed of the vibrator; the signal 830 is the speed of the vibrator after the excitation signal is terminated, indicating the residual vibration of the vibrator; the signal 840 is the threshold voltage, that is, the level of the residual vibration 830; the signal 850 is the appearance of the braking signal of the present invention. Comparing with the motion state diagram of the conventional linear vibration motor shown in FIG. 1B after driven to vibration, it can be seen that the residual vibration 830 of the linear resonant actuator of the present invention after the appearance of the braking signal is significantly reduced and shortened when compared with the prior art.

Figure 9:
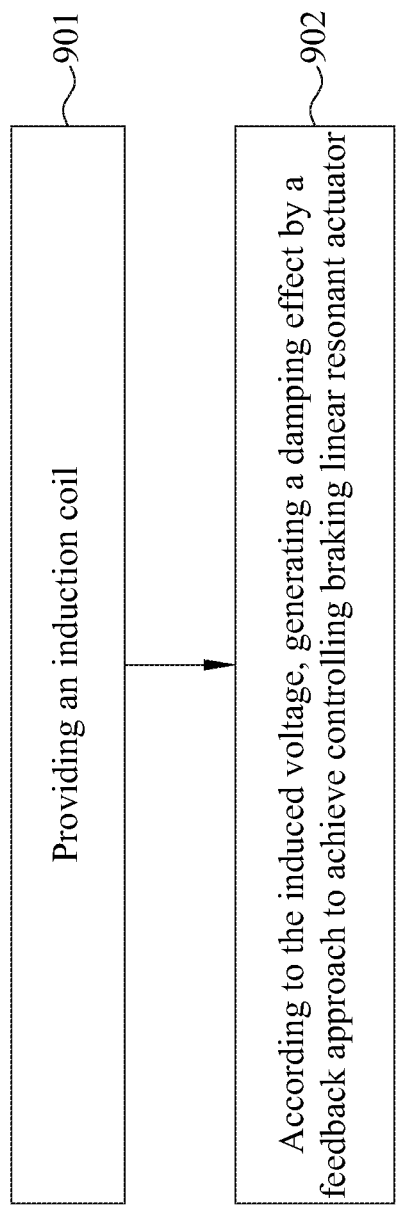
FIG. 9 is a flow chart showing a brake control method of the linear resonant actuator of the present invention.

FIG. 9 shows a flow chart of a brake control method for a linear resonant actuator of the present invention, comprising the following steps:

step 901: providing an induction coil, the induction coil being disposed outside a vibrator of the linear resonant actuator, and the induction coil being fixed with respect to the vibrator, wherein the arrangement of the position and winding manner of the induction coil able to obtain an induced voltage proportional to vibration speed of the vibrator.

step 902: according to the induced voltage, generating a damping effect by a feedback approach to achieve controlling braking linear resonant actuator; wherein the damping effect must satisfy the following conditions:

according to the motion equation $m*a=-b*v-k*x+f$; wherein m is the mass of the vibrator, b is the actuator damping coefficient, k is the spring constant, a is the acceleration, v is the speed, and x is the displacement, f is the driving force; and $k*x$ is the displacement restoring force, $b*v$ is the damping force; let $f=-b'*v$ denote the equivalent damping force to be generated by the driving coil, wherein b' is the damping coefficient for braking;

therefore, the above motion equation becomes: $m*a=-(b'+b)*v-k*x$; wherein $-(b'+b)*v$ is damping force under the effect of the brake control method of the present invention, i.e., the target damping effect to be generated.

In other words, b' is the damping coefficient of the braking effect, comprising induction coil sensitivity (voltage/speed) and the driving efficiency of the linear resonant actuator multiplied by control system gain (force/voltage). In a preferred embodiment, the induction coil and the driving coil of the linear resonant actuator may be located at different positions, or the induction coil and the driving coil of the linear resonant actuator may partially overlap.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A linear resonant actuator, comprising: a vibrator, one or more driving coils, a displacement restoring force device, a fixed end, and an induction coil; wherein the vibrator being vibrator comprising a magnet set; the displacement restoring force device having one end connected to the fixed end and the other end connected to the vibrator; the one or more driving coils being located at the periphery of the vibrator; the induction coil being fixed with respect to the vibrator.

2. The linear resonant actuator according to claim 1, wherein the induction coil and the driving coil may be located at different positions, or the induction coil and the driving coil may partially overlap.

3. The linear resonant actuator according to claim 1, wherein the induction coil can obtain an induced voltage proportional to the speed of the vibrator by arranging an appropriate position and winding manner.

4. The linear resonant actuator according to claim 1, wherein the displacement restoring force device further comprises at least one elastic element.

5. A control system for a linear resonant actuator, applicable to a linear resonant actuator having an induction coil for sensing vibration speed of the linear resonant actuator, the control system comprising:
a signal amplifier, for amplifying an induced voltage of the induction coil of the linear resonant actuator into an induction signal;
an excitation device, for generating an excitation signal able to cause the linear resonant actuator to vibrate;
a flow controller, for receiving a command, generating a control flow, and outputting a state signal corresponding to the control flow;
a processing unit, connected to the signal amplifier, the excitation device, and the flow controller, according to the state signal outputted by the flow controller, for stopping outputting in a stop state, outputting the excitation signal in an excitation state, and processing the induction signal into a braking signal of a suitable system damping coefficient and outputting as a driving signal; and
a driver, connected to the processing unit and the linear resonant actuator, for driving the linear resonant actuator according to the driving signal outputted by the processing unit.

6. The control system for a linear resonant actuator according to claim 5, wherein the control system does not drive the linear resonant actuator in the stop state, and the control system obtains DC offset of induction signal for compensation.

7. The control system for a linear resonant actuator according to claim 5, wherein the excitation device achieves vibration by outputting a predetermined waveform, or adjusting frequency, time interval, polarity, and amplitude of other adjustable output waveform.

8. The control system for a linear resonant actuator according to claim 5, wherein in the braking state, the control system processes an induction signal and feedbacks to the driver to drive the linear resonant actuator to attenuate vibration of the vibrator.

9. The control system for a linear resonant actuator according to claim 8, wherein the magnitude of the induction signal is checked during the braking state to stop the output and to terminate the braking state.

10. The control system for a linear resonant actuator according to claim 5, wherein the excitation signal is an analog signal, and the driver is an analog driver; when the damping coefficient is appropriate, the processing unit directly uses the induction signal as the driving signal in the braking state.

11. The control system for a linear resonant actuator according to claim 5, wherein the excitation signal is a digital signal, and the driver is an analog driver; the processing unit comprises an analog-to-digital converter (ADC), a signal processor, and a digital-to-analog converter (DAC); in the braking state, the processing unit converts the analog induction signal into a digital signal by the ADC, and the signal processor performs a digital multiplication operation to use as a braking signal; and output signals obtained in each state are converted through the DAC into an analog driving signal provided to the analog driver.

12. The control system for a linear resonant actuator according to claim 11, wherein in the braking state, each time after the ADC converts and outputs signal, the ADC pauses for a preset period of time and then performs the next conversion.

13. The control system for a linear resonant actuator according to claim 5, wherein the processing unit comprises a signal processor; the driving signal provided to the driver is one or a combination of the representatives of forward driving (positive), reverse driving (negative), and non-driving (zero), and referred to as a polarity signal; the signal processor provides a function of converting the real-time induction signals, calculating, and outputting the braking signal in a form of one of the polarity signals;

the signal processor internally sets two threshold voltages V+ and V−, V+ is higher than the induction signal in the stop state, and V− is lower than the induction signal in the stop state; when the voltage of the real-time induction signal is higher than V+, the output of the signal processor is positive; when the voltage of the real-time induction signal is lower than V−, the output of the signal processor is negative; and when the voltage of the real-time induction signal is between V+ and V−, the output of the signal processor is zero;

the excitation signal is also in the form of a polarity signal;

in the braking state, the processing unit uses the polarity signal outputted by the signal processor as the braking signal, and the driver is a digital driver.

14. The control system for a linear resonant actuator according to claim 13, wherein in the braking state, after the signal outputted by the signal processor changes state, the output is maintained for a predetermined period of time and then updated.

15. A brake control method for a linear resonant actuator, comprising the following steps:

providing an induction coil, the induction coil being disposed outside a vibrator of the linear resonant actuator, and the induction coil being fixed with respect to the vibrator, wherein the arrangement of the position and winding manner of the induction coil able to obtain an induced voltage proportional to vibration speed of the vibrator;

according to the induced voltage, generating a damping effect by a feedback approach to achieve controlling braking linear resonant actuator; wherein the damping effect satisfying the following conditions:

according to the motion equation $m*a=-b*v-k*x+f$; wherein m is the mass of the vibrator, b is the actuator damping coefficient, k is the spring constant, a is the acceleration, v is the speed, and x is the displacement, f is the driving force; and $k*x$ is the displacement restoring force, $b*v$ is the damping force; let $f=-b'*v$ denote the equivalent damping force to be generated by the driving coil, wherein b' is the damping coefficient for braking;

the above motion equation becomes: $m*a=-(b'+b)*v-k*x$; wherein $-(b'+b)*v$ is damping force under the effect of the brake control method, which is the target damping effect to be generated.

16. The brake control method for a linear resonant actuator according to claim 15, wherein b' is the damping coefficient of the braking effect, comprising induction coil sensitivity in voltage/speed and the driving efficiency of the linear resonant actuator multiplied by control system gain in force/voltage.

17. The brake control method for a linear resonant actuator according to claim 15, wherein the induction coil and the driving coil of the linear resonant actuator may be located at different positions, or the induction coil and the driving coil of the linear resonant actuator may partially overlap.

* * * * *